United States Patent [19]
Coughlin et al.

[11] Patent Number: 4,487,909
[45] Date of Patent: * Dec. 11, 1984

[54] TERNARY ADHESIVE SYSTEMS CONTAINING A POLYESTER POLYOL, AN ISOCYANATE-POLYESTER-URETHANE, AND A CROSSLINKING AGENT WHICH IS A POLYISOCYANATE

[75] Inventors: James E. Coughlin, Philadelphia, Pa.; Eugene G. Sommerfeld, Mt. Laurel, N.J.; Clifford H. Strolle, Springfield, Pa.

[73] Assignee: E. I. Du Pont de Nemours and Company, Wilmington, Del.

[ * ] Notice: The portion of the term of this patent subsequent to Dec. 6, 2000 has been disclaimed.

[21] Appl. No.: 538,271

[22] Filed: Oct. 3, 1983

Related U.S. Application Data

[63] Continuation-in-part of Ser. No. 404,981, Aug. 9, 1982, Pat. No. 4,419,476, which is a continuation-in-part of Ser. No. 310,069, Oct. 9, 1981, abandoned.

[51] Int. Cl.³ .............................................. C08G 18/42
[52] U.S. Cl. ....................................... 528/60; 528/65; 528/66
[58] Field of Search ............................... 528/60, 65, 66

[56] References Cited

U.S. PATENT DOCUMENTS

| | | | |
|---|---|---|---|
| 3,584,075 | 6/1971 | Bock et al. | 528/80 |
| 3,666,835 | 5/1972 | Schloss | 528/44 |
| 3,763,079 | 10/1973 | Fryd | 528/289 |
| 3,804,810 | 4/1974 | Fryd | 528/80 |
| 4,206,299 | 6/1980 | Yamayaki et al. | 528/288 |
| 4,298,724 | 11/1981 | Sommerfeld et al. | 528/302 |

Primary Examiner—Maurice J. Welsh

[57] ABSTRACT

Disclosed are adhesive systems and adhesives formed from (A) hydroxyl-terminated, preferably branched, polyols containing adipic acid, (B) isocyanate-capped, polyol-based urethanes also containing adipic acid and (C) polyisocyanate cross-linking agents.

17 Claims, No Drawings

TERNARY ADHESIVE SYSTEMS CONTAINING A POLYESTER POLYOL, AN ISOCYANATE-POLYESTER-URETHANE, AND A CROSSLINKING AGENT WHICH IS A POLYISOCYANATE

This application is a continuation-in-part of our copending application Ser. No. 404,981, filed Aug. 9, 1982, and now U.S. Pat. No. 4,419,476, issued Dec. 6, 1983. Ser. No. 404,981 was a continuation-in-part of our copending application Ser. No. 310,069, filed Oct. 9, 1981, and now abandoned.

BACKGROUND OF THE INVENTION

1. Field of the Invention

The invention of this application relates to the aspect of the invention of application Ser. No. 404,981, that is, ternary adhesives and systems formed from a branched polyester, an isocyanate-capped polyester-urethane, and a polyisocyanate, wherein adipic acid alone serves as the aliphatic dicarboxylic acid in the branched polyester and the polyester-urethane. Application Ser. No. 404,981, of which this is a continuation-in-part, is specifically incorporated herein by reference.

2. Prior Art

Bock et al. U.S. Pat. No. 3,584,075 shows a polyurethane adhesive based on an aliphatic polyester, an aromatic polyester, and a diisocyanate.

Schloss U.S. Pat. No. 3,666,835 shows textile laminating adhesives based on a hydroxyl-terminated urethane prepolymer and an isocyanate-terminated urethane prepolymer.

Fryd U.S. Pat. Nos. 3,763,079 and 3,804,810 show hydroxyl-terminated polyurethanes formed from copolyesters.

Yamazaki et al. U.S. Pat. No. 4,206,299 shows an adhesive for plastics and metal foil containing a silane coupling agent and acknowledges certain other prior art.

Sommerfeld et al. U.S. Pat. No. 4,298,724 (Sommerfeld) shows branched polyesters some of which are useful in this invention and procedures for making them applicable to all.

The above-identified art is incorporated herein by reference.

SUMMARY OF THE INVENTION

Our allowed copending application Ser. No. 404,981 claims certain novel laminating ternary adhesive systems and adhesives in which the preferred embodiment is based upon azelaic acid polyesters. In accordance with the present invention, it has been found that a second preferred embodiment based upon polyesters of the somewhat cheaper adipic acid functions substantially as well as the embodiment based upon azelaic acid. Except for the substitution of adipic for azelaic acid, the invention here is thus identical with the preferred embodiment of Ser. No. 404,981.

The invention, therefore, broadly comprises compositions formed at the time of use by the interaction of the three precursors:

A. a hydroxyl-terminated adipic acid-containing branched polymer of low-molecular weight, preferably a branched polyester;
B. an isocyanate-terminated substantially linear adipic acid polyester-urethane of low molecular weight (itself novel); and
C. a polyisocyanate crosslinking agent.

Details of the invention follow.

THE HYDROXYL-TERMINATED BRANCHED POLYESTER

A. The first of the three precursors of the present adhesives, polymer A, is a polymeric polyol, preferably a branched hydroxyl-terminated polyester. The polyester is prepared in a single step by conventional methods for preparing polyesters from conventional materials, e.g., (1) a diol, (2) generally a higher polyol (i.e., one containing more than two hydroxyl groups per molecule), (3) a dibasic aromatic acid, and (4) the dibasic aliphatic acid, adipic acid.

Diols (1) usable here are any of those commonly employed. They can be aliphatic or aromatic and generally have 2–14 carbons. They can be substituted with or interrupted with noninterfering groups such as O, S, halogen, and the like. Suitable diols include: ethylene glycol, propylene-1,2-glycol, propylene-1,3-glycol, butylene-1,3-diol, butylene-1,4-diol, butylene-2,3-diol, neopentyl-glycol, i.e., 2,2-dimethylpropane-1,3-diol, 2,2-diethylpropane-1,3-diol, 2-methyl-2-propylpropane-1,3-diol, decamethylene glycol, dodecamethylene glycol, thioethylene glycol, monoethyl ether of glycerine, α- and β-allyl ethers of glycerol, and the like. Polycaprolactone diol, the reaction product of caprolactone and ethylene glycol, can also be used.

Preferably the diols will have about 2–8 carbon atoms; most preferably they will have about 2–6 carbon atoms. Ethylene glycol is particularly preferred.

Higher polyols (2) used as branching agents, preferably have 3–14 carbons and a functionality greater than 2. They include triols, tetraols, etc., such as glycerine, trimethylolpropane, pentaerithrytol, 1,2,6-hexanetriol, and the like.

Aromatic (3) acids can be unsubstituted or can contain, be substituted with or be interrupted by noninterfering groups such as O, S, halogene, keto and the like. The preferred aromatic acids, however, are the various phthalic acids, i.e., phthalic, isophthalic and terephthalic acids, and their anhydrides. Lower alkyl esters of these acids can also be used in a transesterification process.

The usable polyesters are generally prepared from the ingredients of the products of the abovementioned Sommerfeld patent and in substantially the same manner. They are not, however, coextensive with those products since some of the unsatisfactory oils of that application can be employed here. This fact is evident from the ratios of materials used.

The first of these ratios is $X_{1A}$, where $$X_{1A} = \frac{\text{Total Moles of Polyol}}{\text{Total Moles of Diacid}}.$$

In a broad range, $X_{1A}$ extends between 1.05 and 1.5. More narrowly, in a preferred range, it is between 1.2 and 1.3. $X_{1A}$ defines the molecular weight ($\overline{M}_n$) of the prepolymer, i.e., $\overline{M}_n = 1{,}000\text{--}5{,}000$. (In all the ratios used, the denominator is assumed as 1 unless given.)

A second ratio is $X_{2A}$, where $$X_{2A} = \frac{\text{Total Moles of Diol}}{\text{Total Moles of Higher Polyol}}.$$

Broadly, $X_{2A}$ is between $\infty$ and 0.86, preferably between $\infty$ and 2.25, i.e., higher polyol can be omitted.

More preferably, however, it is between 12 and 3.3. $X_{2A}$ defines the branching of the polyester.

A third ratio is:

$$X_{3A} = \frac{\text{Moles of Aromatic Acid}}{\text{Moles of Total Acid}}.$$

The presence of some aromatic materials is important in this invention, e.g., to increase adhesion, heat resistance, etc., of the product. It can be supplied from two sources, from the polyester A and the polyester-urethane B. Consequently, $X_{3A}$ lies in the range O–ca. 0.8, 0, of course, indicating that aromaticity is supplied by component B. Preferably, however, the lower limit for $X_{3A}$ should be about 0.3 and a preferred range is 0.3–0.65.

As indicated in the Sommerfeld patent, the polyesters A can be prepared very simply. The ingredients may be mixed in proportions indicated by the ratios $X_{1A}$, $X_{2A}$, and $X_{3A}$ and heated in the range of about 160°–260° C. with removal of water as the reaction proceeds. The product has an acid number of less than 5 or, often, less than 1. Alternatively, transesterification can be employed using lower alkyl esters such as methyl esters rather than acids. In this alternate process, a transesterification catalyst such as an organometallic compound of tin, etc., is needed and an alcohol rather than water is removed. $\overline{M}_n$ by either route is about 1,000–5,000.

THE ISOCYANATE-TERMINATED URETHANE

The polyester-urethane B is an isocyanate-terminated polymer of low-molecular weight formed by chain extending and endcapping at least one substantially linear hydroxyl-terminated polyester, here regarded as a prepolymer, by reaction with at least one diisocyanate. The reaction including ingredients and conditions but usually without catalyst is otherwise substantially as shown by the Fryd patents (see especially columns 1–4 of U.S. Pat. No. 3,763,079) and proceeds by steps. The polyester prepolymer is first formed by direct action between diol and diacid. It is then reacted with a diisocyanate possibly in the vessel in which it was prepared. Copolyesters are not essential, however, only preferred, and two different dicarboxylic acids are not essential.

Ratios can be set up for B as for A, above. Thus, for the prepolymer and hence for B itself, $$X_{1B} = \frac{\text{Total Moles of Polyol}}{\text{Total Moles of Diacid}}$$

is within the range 1.05–1.5 ($\overline{M}_n = 500$–4,000).

$$X_{2B} = \frac{\text{Total Moles of Diol}}{\text{Total Moles of Higher Polyol}}.$$

is within the range 5–$\infty$, since some branching is satisfactory. Preferably, $X_{2B}$ is at least 10. And $$X_{3B} = \frac{\text{Moles of Aromatic Acid}}{\text{Total Moles of Acid}} = 0-0.8.$$

Since isocyanate-terminated or end-capped products are desired here, the ratio of isocyanate to hydroxyl is appreciably larger than in Fryd who teaches non-NCO-containing polyester-urethanes. This additional equivalent ratio, $$X_{4B} = -NCO/-OH.$$

is broadly in the range 2–1.2 with the range 1.7–1.3 being preferred.

The (co)polyesters are produced by conventional techniques which are well known. Ordinarily, the reactants will be admixed in a suitable reaction vessel, with heating to a temperature of about 150° C.–250° C. for 5–15 hours to produce the polyester. Diols, dicarboxylic acids and higher polyols, where employed, can be those given above for the preparation of polyester A. A preferred polyol branching agent is trimethylol propane.

The polyester-urethanes of the invention are obtained by reacting directly the substantially linear hydroxyl-terminated polyester prepolymers with diisocyanates, generally in an organic solvent. Any of the common organic solvents are usable so long as they are dry and lack hydroxyl or other groups reactive with isocyanate. Ketones such as acetone, methyl ethyl ketone and the like are particularly useful. In this reaction, the equivalent ratio of isocyanate from the diisocyanate to hydroxyl from the prepolymer are greater than 1/1 as is evident from the values of $X_{4B}$, above.

The diisocyanates for use with the polyesters in this invention can be aliphatic or aromatic. Suitable isocyanates include: hexane-1,6-diisocyanate, decane-1,10-diisocyanate, diisocyanates derived from dimerized fatty acids, phenylene-1,4-diisocyante, toluene-2,4-diisocyanate, toluene 2,6-diisocyanate, naphthylene-1,5-diisocyanate, diphenylmethane-4,4'-diisocyanate, diphenylmethane-3,3'-dimethoxy-4,4'-diisocyanate, dicyclohexylmethane-4,4'-diisocyanate, etc.

Preferred are toluene-2,4-diisocyanate, toluene-2,6-diisocyanate and mixtures thereof.

The products B of the polyester-isocyanate reaction are very soluble but nonvolatile isocyanates and have the general utilities of isocyanates, e.g., as reactants with hydroxyl-carrying compounds to prepare polyurethane coating materials, or the like. In some cases, they can serve as crosslinkers but here the use of a polyisocyanate C is preferred.

THE POLYISOCYANATE

The precursors A and B are reacted in situ in the laminate of the invention to form what is basically a block copolymer. This procedure permits low molecular weight and low viscosity of the components in the adhesive of the mix directly after combining the components but develops a high molecular weight product by extension in situ upon the workpiece, i.e., a substrate such as film, metal, etc., upon curing. Sufficient crosslinking between the hydroxyl Groups of A and the isocyanate groups of B is not generally attainable without the presence of a more highly functional corsslinking agent. To achieve the desired results, polyester A is used in excess over polyesterurethane B, and some of the isocyanate deficiency is supplied by at least one polyisocyanate crosslinking agent C having an average functionality greater than 2.

Usable polyisocyanates include aliphatic or aromatic compounds such as 4,4',4''-triisocyanatotriphenyl methane, 1,3,5-triisocyanatobenzene, 2,4,6-triisocyanatotoluene, and the like, biurets of the diisocyanates mentioned above such as the trimerization product of hexane-1,6-diisocyanate, adducts of one or more diisocyanates with one or more higher polyols such as propane triol, 1,2,6-hexane triol, trimethylolpropane, pentaerythritol, etc. Preferred polyisocyanates are the adducts of aromatic diisocyanates with trimethylolpropane in a 3/2 or 5/2 mole ratio to yield a polyisocyanate having a functionality of 3 or 4, such as the adduct of toluene-2,4-diisocyanate or toluene-2,6-diisocyanate, or mixtures thereof, with trimethylolpropane in a 5/2 mole ratio.

The proporations of B and C in the mixture employed can vary within limits but at least 50% (by weight) of B is preferred. A broad range of B is 94-50% with a preferred range of 90-70%. Conversely, the ranges of C are 6-50 and 10-30%, respectively. The higher ranges of C, e.g., above about 30%, result in embrittlement but can be used where brittle adhesives are desired. All of these compounds are very soluble in nonreactive organic solvents, e.g., ketones such as methyl ethyl ketone (MEK), esters such as ethyl acetate (EA), etc. Consequently, solutions of 50-70% by weight at room temperature can readily be obtained, with above 60%, i.e., 62-75%, being generally made. These solutions or blends have the normal utilities of polyfunctional isocyanates.

The ratio of polyester A to the combined isocyanates is also of importance. A should form 25-75% by weight of the final adhesive mixture and combined B and C should form the remaining 75-25%, all based on the solids present. For higher solids use, A should form 40-65% of the final adhesives. The total aromaticity derived from the aromatic acids in A plus B should be no less than 15% on a mole basis of the total acids present.

The two isocyanates used in the adhesive, polyester-urethane B and polyisocyanate C, may conveniently be mixed before the reaction with polymer A. They may, in fact, be packaged together and used as one package of a two-package adhesive system. Solvents are generally used to lower the viscosity sufficiently to permit utilization while maintaining EPA compliance in the final blend. Any organic solvent inert to organic isocyanates can be employed, the amount being varied in accord with the application requirements. Representative solvents include methyl ethyl ketone, methyl isobutyl ketone, acetone, dimethyl sulfoxide, isophorone, mono(lower-alkyl) ethers of ethylene glyocl acetate, mone(lower-alkyl) ethers of diethylene glycol acetate, lower alkyl acetates, etc.

A catalyst to speed up reaction between polyester A of the first package and isocyanates B and C of the second package may be added to either package, if desired. The catalyst, useful particularly at lower temperatures, can consist of organometallics such as dibutyltin dilaurate, etc., organic bases such as amines, and the like. Up to about 100 ppm based on total package solids is effective. Catalyst can also be added separately to the adhesive when it is mixed, if desired.

THE ADHESIVE

Polyester A and the two isocyanates B and C (separately or packaged) are mixed together at the time of use. Because of their solubility and low viscosity in organic solvents, they product high solids adhesives, i.e., adhesives containing 50-90% by weight of solids or here preferably 60-75% or most preferably 65-70%, and are useful in minimizing pollution. They can be employed with a wide variety of substrates, e.g., paper, plastic film, glass, wood, and the like.

The mixed adhesives can be applied to substrates in any convenient manner. If, however, their viscosity is less than 1000 centipoise at room temperature (about 20° C.), they can be applied by direct gravure procedures. The present adhesives in general have such a viscosity, i.e., less than 1000 cps, and can retain it for up to 8 hours. Thus, they can be used with conventional direct gravure machinery, e.g., the Faustel Model TT coater/laminator made by Faustel, Inc., Butler, Wisc., currently employed with conventional, i.e., not high solids, adhesives. Expensive conversion to offset gravure machinery is thus avoided. As far as is known, these novel ternary adhesives are the first high solids adhesives applicable by direct gravure to give the balance of properties heretofore mentioned.

In their preferred embodiment, the final products of the invention possess sufficient green strength and sufficient resistance to heat, moisture, oils and acid to be used as boil-in-bag adhesives. Their aromatic content makes them especially valuable in bonding flexible films, e.g., polyethylene, metal foil, etc., to poly(ethylene terephthalate).

In usual boil-in-bag technology, poly(ethylene terephthalate) and polyethylene films are bonded together by means of adhesive (preferably by direct gravure), the resultant laminated film is folded, and the (inner) polyethylene film is itself sealed by heat around two edges to form the inside of a pouch. Food is placed in the pouch and the polyethylene film is heat sealed to itself along the third edge (the fourth "edge" is the fold). The sealed pouch is placed in boiling water for one hour. If no delamination occurs within this period, the sealed bag is considered acceptable.

There follows an example illustrating the invention. A, B and C represent respectively and as above the hydroxyl-terminated branched polyester, the isocyanate-terminated polyester-urethane and the polyisocyanate crosslinking agent. The last mentioned was Mondur ® CB-75, the 5/2 molar product of toluene diisocyanate (TDI) and trimethylol propane supplied at 75% solids in ethyl acetate (EA) by Mobay Chemical Company. Temperatures were in degrees centigrade and percentages and proportions in terms of weight unless otherwise noted. Application, testing and properties were the same as in Ser. No. 404,981.

EXAMPLE (a) A 12-l, 3-necked resin flask fitted with a fractionating column mounted with a water-separator or variable take-off head, an agitator and a thermometer was charged with:

| Ingredient | Weight (g) |
| --- | --- |
| Trimethylol propane (TMP) | 898.99 |
| Ethylene glycol (EG) | 1983.19 |
| Terephthalic acid (T) | 712.42 |
| Isophthalic acid (I) | 1185.36 |
| Adipic acid (6) | 3225.83 |
| | 8005.79 |

The reaction mixture was heated to 260° as 1205.80 g of water was collected over a 12-hr. period. The vapor temperature was held below 105° C. At Acid No=0.94, the charge was cooled and thinned with methyl ethyl ketone (MEK) to 85% solids. The product was a solution of the polyester TMP/EG/T/I/6 of the mole ratio 0.2/0.954//0.128/0.213/0.659: Gardner-Holdt visc.=Zl; Hydroxyl No=130; Residual EG=0.73%; % $H_2O$=0.065%; GPC $\overline{M}_n$=3500, $\overline{M}_w$=17000, $\overline{M}_z$=50000; D=4.9; sp g dist 0.9950.

(b) 1. A polyester prepolymer was prepared in a flask as above charged with:

| Ingredient | Weight (g) |
|---|---|
| EG | 3234.55 |
| T | 1918.12 |
| I | 992.13 |
| 6 | 3298.29 |
| | 9443.10 |

The reaction mixture was heated to 260° as 1443 g of water was collected over a period of 13 hrs. The mixture was cooled at a final Acid No. of 1.4 to give a prepolymer of the mole ratio EG//T/I/6 1.3//0.288/0.149/0.563; Hydroxyl No=133 (Theo. 167); Residual EG=3.1%; $H_2O$=0.056%; GPC $\overline{M}_n$=1500, $\overline{M}_w$=2000; $\overline{M}_z$=3200; D=1.5; sp g dist=1.001.

2. Polyester prepolymer from 1, above was end-capped and chain-extended with toluene diisocyanate (TDI) in the equivalent ratio $X_{4B}$=1.67 (based on Hydroxyl No=140). A 3-necked flask fitted with a reflux condenser and agitator was charged with 725 g of TDI and 908.4 g of ethyl acetate. The mixture was agitated, purged and blanketed with $N_2$ and heated to 87° at which time 2000 g of polyester prepolymer was added over 2 hrs. The reaction was then held at reflux for 6 hrs. and cooled to room temperature to give a solution: Gardner-Holdt visc.=Z-4 at 75% solids (G-H visc.=J-1½ at 60% solids); NCO=3.18% (on solids); Resid TDI=0.04%; GPC $\overline{M}_n$=4000, $\overline{M}_w$=8800, $\overline{M}_z$=16000.

(c) Polyester A and the isocyanate-terminated polyester-urethane B, both above, and polyisocyanate C (Mondur®CB-75) were blended together in MEK for one-half hour at the time of use to contain:

| Component | Weight of Charge (g) |
|---|---|
| A (85% solids in MEK) | 67.3 |
| B (75% solids in EA) | 44.9 |
| C (75% solids in EA) | 12.1 |
| MEK | 29.5 |
| | 153.8 |

The weight ratio A/B/C=57.24/33.67/9.09 (dry); B/C=78.74/21.26 (dry); Solids=65%; visc=15-25 sec Zahn No. 3 (120-300 cps).

The mixture thus prepared was coated within 8 hours onto 48 LB Mylar® (trademark of E. I. du Pont de Nemours and Company) poly(ethylene terephthalate) film and laminated in rolls by direct gravure to medium density polyethylene (MDPE) film by means of a Faustel Model TT coater/laminator (Faustel, Inc., Butler, Wisconsin). The following conditions were maintained throughout the test:
Cylinder: 200 TH (trihelical)
Oven Temp: 93°
Speed: 30 ft/min (9.1 m/min)
Coater Nip: 80 psi (5.6 $Kg/cm^2$).

Coating weights were determined to be 1.1 to 1.6 lbs/300 $ft^2$ (1.7-2.6 $g/m^2$). Peel strengths (90° and 180°, angular) were determined using an Instron "C" cell at 25° with a crosshead speed of 12 in/min (30 cm/min). Green strength values (taken within 2 hours) were in the range 100-300 g. After three days, bond strengths were in the range 600-1300 g. Generally, one of the substrate films then tore before the bond. Similar results were obtained after 8 weeks.

(d) Pouches (6"×6"; 15 cm×15 cm) were prepared from the Mylar®/MDPE laminate from (c) by folding and sealing on a Sentinel Heat Sealer (375° F.; 40 psi; 1.0 sec: 190° C.; 2.8 $Kg/cm^2$; 1.0 sec) along three edges of the polyethylene inner layer to form bags open at one edge. Two separate bags were filled ⅔ full of water and a commercial tomato sauce respectively. The thus-filled bags were heat sealed on the open edge after air was manually squeezed from them. The bags were then held for an hour in boiling water. The bags were regarded as satisfactory, i.e., no delamination occurred, after the treatment described.

We claim:
1. A ternary adhesive system consisting essentially of:
A. a polyester polyol of adipic acid having a molecular weight $\overline{M}_n$ of about 1,000-5,000 and soluble in methyl ethyl ketone or ethyl acetate to the extent of at least 65% by weight;
B. an isocyanate-capped polyester-urethane formed from at least one diacid including adipic acid and at least one polyol having a molecular weight $\overline{M}_n$ of about 500-4,000 which has been extended and capped with a diisocyanate in the —NCO/—OH ratio of 2/1-1.3/1 and is capable of forming a block copolymer with and thereby extending polyol A; and
C. a polyisocyanate crosslinking agent C supplying 6-50% by weight in a mixture of B plus C.

2. An adhesive system of claim 1 wherein the polyester polyol A is a copolymer of at least one aromatic dicarboxylic acid and adipic acid with at least one polyol, $$\text{the ratio } X_{1A} = \frac{\text{Total Moles of Polyol}}{\text{Total Moles of Diacid}}$$

extending between 1.05/1 and 1.5/1, $$\text{the ratio } X_{2A} = \frac{\text{Total Moles of Diol}}{\text{Total Moles of Higher Polyol}}$$

extending between ∞ and 0.86/1, and $$\text{the ratio } X_{3A} = \frac{\text{Moles of Aromatic Acid}}{\text{Moles of Total Acid}}$$

extending between 0 and about 0.8/1.

3. An adhesive system of claim 2 wherein the polyester polyol A is a copolyester of at least one phthalic acid and adipic acid.

4. An adhesive system of claim 2 wherein the polyester polyol A is a copolyester of at least one phthalic acid and adipic acid with ethylene glycol and trimethylol propane.

5. An adhesive system of claim 2 wherein the polyester-urethane B is formed from a hydroxyl-bearing polyester made from at least one polyol and at least one diacid including adipic acid wherein $$\text{the ratio } X_{1B} = \frac{\text{Total Moles of Polyol}}{\text{Total Moles of Diacid}}$$

is within the range 1.05/1-1.5/1 and the molecular weight $\overline{M}_n$=500-4,000, the ratio $X_{2B} = \dfrac{\text{Total Moles of Diol}}{\text{Total Moles of Polyol}}$ is within the range 5/1–∞, the ratio $X_{3B} = \dfrac{\text{Moles of Aromatic Acid}}{\text{Total Moles of Acid}}$ is within the range 0–0.8/1, and the ratio $X_{4B} = \dfrac{\text{Equivalents of —NCO}}{\text{Equivalents of —OH}}$ is within the range 2/1–1.3/1.

6. An adhesive system of claim 5 wherein the hydroxyl-bearing polyester is a polyester of ethylene glycol, at least one phthalic acid and adipic acid.

7. A high-solids adhesive formed in situ wherein a polyester polyol of adipic acid A having a molecular weight $\overline{M}_n$ of about 1,000–5,000 and soluble in methyl ethyl ketone or ethyl acetate to the extent of at least 65% by weight is chain-extended and thereby increased in molecular weight by reaction with an isocyanate-capped polyester-urethane B making a block copolymer therewith, said polyester-urethane B being formed from a hydroxyl-bearing polyester made from at least one polyol and at least one diacid including adipic acid and wherein the ratio $X_{1B} = \dfrac{\text{Total Moles of Polyol}}{\text{Total Moles of Diacid}}$ is within the range 1.05/1–1.5/1 and the molecular weight $\overline{M}_n = 500$–4,000, the ratio $X_{2B} = \dfrac{\text{Total Moles of Diol}}{\text{Total Moles of Polyol}}$ is within the range 5/1–∞, the ratio $X_{3B} = \dfrac{\text{Moles of Aromatic Acid}}{\text{Total Moles of Acid}}$ is within the range 0–0.8/1, and the ratio $X_{4B} = \dfrac{\text{Equivalents of —NCO}}{\text{Equivalents of —OH}}$ is within the range 2/1–1.3/1.

8. An adhesive formed from:
A. a hydroxyl-terminated polyester polyol of adipic acid having a molecular weight $\overline{M}_n$ of about 1,000–5,000 and soluble in methyl ethyl ketone or ethyl acetate to the extent of at least 65% by weight;
B. an isocyanate-capped polyester-urethane formed from a polyester polyol of adipic acid and at least one polyol having a molecular weight $\overline{M}_n$ of about 500–4,000 and capable of forming a block copolymer with a thereby extending polyol A; and
C. a polyisocyanate crosslinking agent,
the equivalent ratio of —OH/—NCO being about 1/1 and B supplying at least 50–94% by weight of B plus C.

9. An adhesive of claim 8 wherein the polyester A is a polyester of at least one phthalic acid and adipic acid.

10. An adhesive of claim 8 wherein the polyester A is a polyester of at least one phthalic acid and adipic acid with ethylene glycol and trimethylol propane.

11. An adhesive of claim 8 wherein the polyester-urethane B is formed from a hydroxyl-bearing polyester made from at least one diacid including adipic acid and at least one polyol wherein the ratio $X_{1B} = \dfrac{\text{Total Moles of Polyol}}{\text{Total Moles of Diacid}}$ is within the range 1.05/1–1.5/1 and the molecular weight $\overline{M}_n = 500$–4,000, the ratio $X_{2B} = \dfrac{\text{Total Moles of Diol}}{\text{Total Moles of Polyol}}$ is within the range 5/1–∞, the ratio $X_{3B} = \dfrac{\text{Moles of Aromatic Acid}}{\text{Total Moles of Acid}}$ is within the range 0–0.8/1, and the ratio $X_{4B} = \dfrac{\text{Equivalents of —NCO}}{\text{Equivalents of —OH}}$ is within the range 2/1–1.3/1.

12. An adhesive of claim 11 wherein the polyester-urethane B is formed from the polyester polyol ethylene glycol//terephthalic acid/isophthalic acid/adipic acid in the mole ratio of about 1.3//0.288/0.149/0.513 end-capped with toluene diisocyanate.

13. An adhesive of claim 12 wherein:
A is a polyester of trimethylol propane/ethylene glycol//terephthalic acid/isophthalic acid/adipic acid of the mole ratio of about 0.2/0.954//0.128/0.213/0.659,
the dry weight ratio A/B/C being about 57.24/33.67/9.09 and the dry weight ratio B/C being about 78.74/21.26.

14. An isocyanate-capped polyester urethane formed from a hydroxyl-bearing polyester made from at least one diacid including adipic acid and at least one polyol wherein the ratio $X_{1B} = \dfrac{\text{Total Moles of Polyol}}{\text{Total Moles of Diacid}}$ is within the range 1.05/1–1.5/1 and the molecular weight $\overline{M}_n = 500$–4,000, the ratio $X_{2B} = \dfrac{\text{Total Moles of Diol}}{\text{Total Moles of Polyol}}$ is within the range 5/1–∞, the ratio $X_{3B} = \dfrac{\text{Moles of Aromatic Acid}}{\text{Total Moles of Acid}}$ is within the range 0–0.8/1, and the ratio $X_{4B} = \dfrac{\text{Equivalents of —NCO}}{\text{Equivalents of —OH}}$ is within the range 2/1–1.3/1.

15. The polyester-urethane of claim 14 formed from the polyester polyol ethylene glycol//terephthalic acid- /isophthalic acid/adipic acid in the mole ratio of about 1.3//0.288/0.149/0.513 end-capped with toluene diisocyanate.

16. A flexible laminate wherein substrates are held together by an adhesive of claim 8.

17. A flexible laminate of claim 16 wherein the substrates are polyethylene and poly(ethylene terephthalate) films.